US012626528B2

(12) United States Patent
Sun et al.

(10) Patent No.: US 12,626,528 B2
(45) Date of Patent: May 12, 2026

(54) METHOD FOR OPTIMIZING HUMAN BODY POSTURE RECOGNITION MODEL, DEVICE AND COMPUTER-READABLE STORAGE MEDIUM

(71) Applicant: UBTECH ROBOTICS CORP LTD, Shenzhen (CN)

(72) Inventors: Bin Sun, Shenzhen (CN); Mingguo Zhao, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 373 days.

(21) Appl. No.: 18/214,467

(22) Filed: Jun. 26, 2023

(65) Prior Publication Data

US 2023/0334893 A1 Oct. 19, 2023

Related U.S. Application Data

(63) Continuation of application No. PCT/CN2021/132113, filed on Nov. 22, 2021.

(30) Foreign Application Priority Data

Dec. 29, 2020 (CN) .......................... 202011590719.7

(51) Int. Cl.
*G06V 40/10* (2022.01)
*G06V 10/80* (2022.01)

(52) U.S. Cl.
CPC .......... *G06V 40/103* (2022.01); *G06V 10/806* (2022.01)

(58) Field of Classification Search
CPC .... G06V 40/103; G06V 10/806; G06V 10/82; G06V 10/44; Y02T 10/40; G06F 18/253; G06N 3/045
See application file for complete search history.

(56) References Cited

U.S. PATENT DOCUMENTS 11,074,711 B1 * 7/2021 Akbas .................... G06V 40/20
2021/0059796 A1 * 3/2021 Weiss ................... A61C 9/0053
(Continued)

FOREIGN PATENT DOCUMENTS

CN 109798888 * 5/2019
CN 109798888 A 5/2019
(Continued)

OTHER PUBLICATIONS

ISR for PCT/CN2021/132113.
Written opinions of ISA for PCT/CN2021/132113.

*Primary Examiner* — Ming Y Hon

(57) ABSTRACT

A method includes: obtaining heat maps including a predetermined number of key points of a human body; performing depth separable convolution on a feature map corresponding to one of the heat maps corresponding to each of the key points and a convolution kernel of a corresponding channel of the human body posture recognition model to determine a key point feature map corresponding to each channel of the human body posture recognition model; performing local feature fusion processing and/or global feature fusion processing on the key point feature map corresponding to each channel to obtain fusion posture feature maps; determining a linear relationship between the channels of the human body posture recognition model based on the fusion posture feature maps; and updating weight coefficients of the corresponding channels of the human body posture recognition model by using the linear relationship between the channels of the human body posture recognition model.

20 Claims, 12 Drawing Sheets

(56) References Cited

U.S. PATENT DOCUMENTS

| | | | | |
|---|---|---|---|---|
| 2021/0209349 A1* | 7/2021 | Mehl | ........................ | G06F 18/24 |
| 2022/0083808 A1* | 3/2022 | Zhang | .................... | G06V 20/46 |
| 2022/0191542 A1* | 6/2022 | Ahmadyan | .......... | H04N 19/105 |
| 2022/0301351 A1* | 9/2022 | Zhao | .................... | G06V 10/454 |
| 2025/0196635 A1* | 6/2025 | Chen | .................... | G06F 3/0486 |

FOREIGN PATENT DOCUMENTS

| | | | |
|---|---|---|---|
| CN | 111753643 | * | 10/2020 |
| CN | 111753643 A | | 10/2020 |
| CN | 112131965 A | | 12/2020 |

* cited by examiner

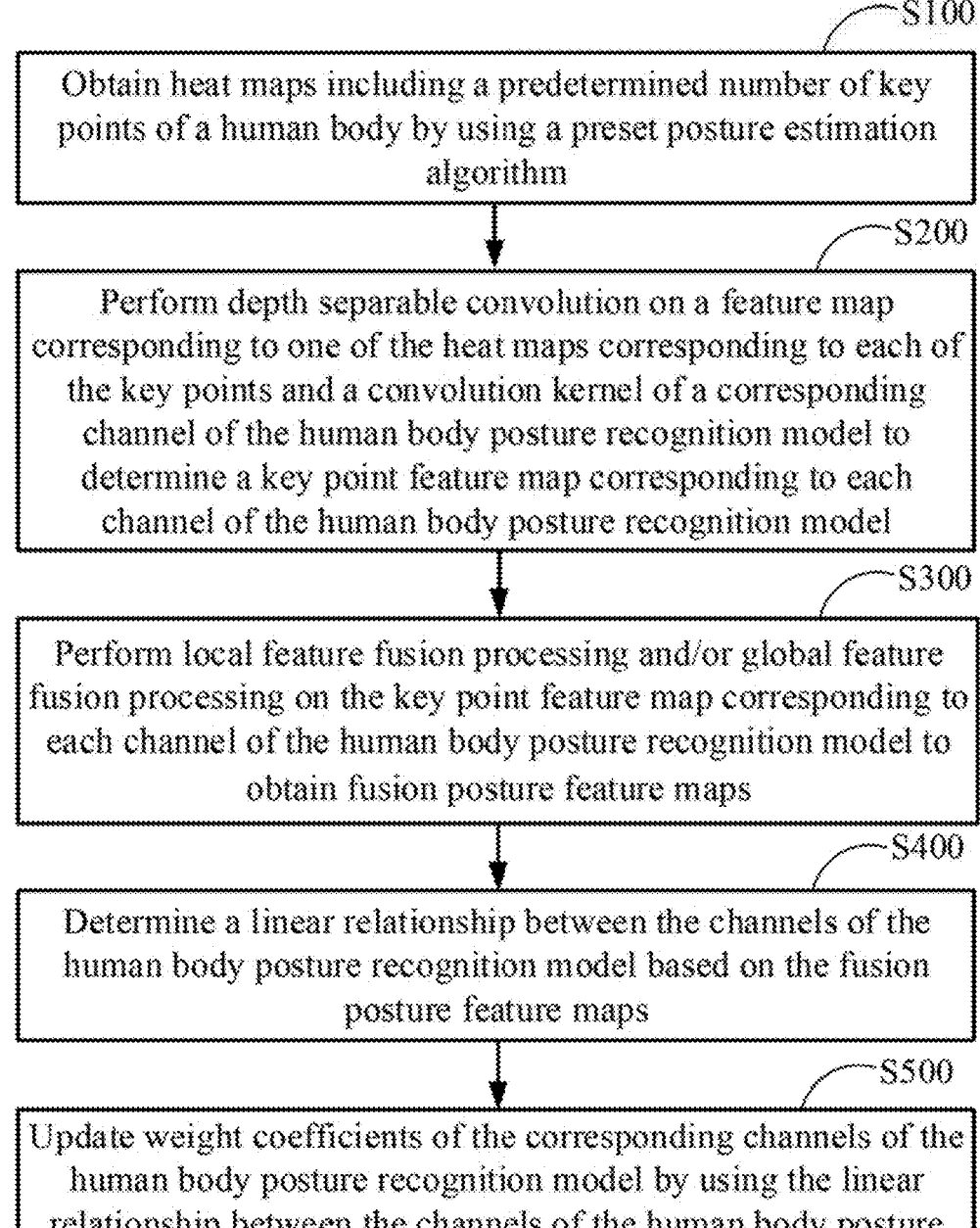

Obtain heat maps including a predetermined number of key points of a human body by using a preset posture estimation algorithm ⌒S100

Perform depth separable convolution on a feature map corresponding to one of the heat maps corresponding to each of the key points and a convolution kernel of a corresponding channel of the human body posture recognition model to determine a key point feature map corresponding to each channel of the human body posture recognition model ⌒S200

Perform local feature fusion processing and/or global feature fusion processing on the key point feature map corresponding to each channel of the human body posture recognition model to obtain fusion posture feature maps ⌒S300

Determine a linear relationship between the channels of the human body posture recognition model based on the fusion posture feature maps ⌒S400

Update weight coefficients of the corresponding channels of the human body posture recognition model by using the linear relationship between the channels of the human body posture recognition model ⌒S500

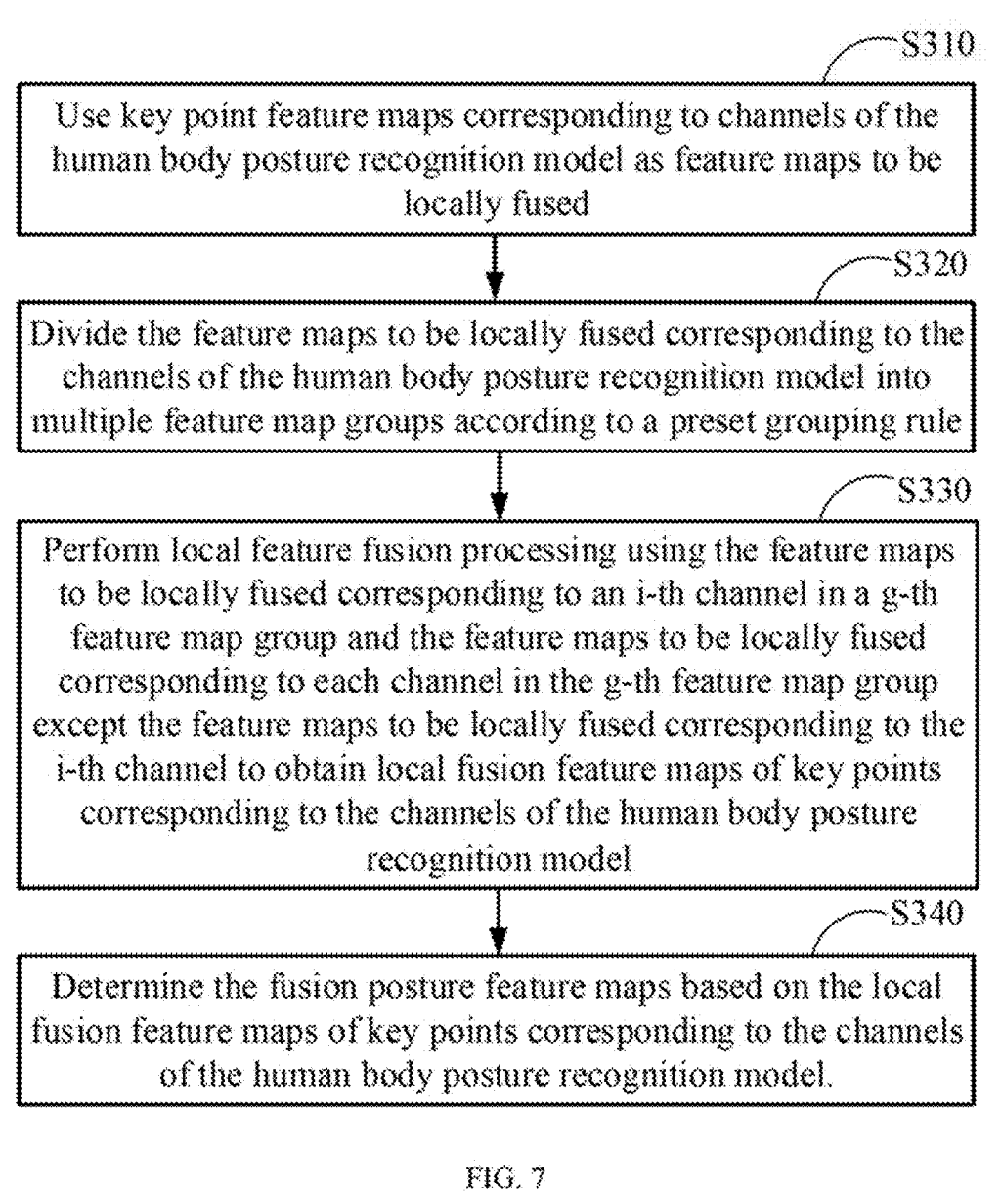

Use key point feature maps corresponding to channels of the human body posture recognition model as feature maps to be locally fused

S320

Divide the feature maps to be locally fused corresponding to the channels of the human body posture recognition model into multiple feature map groups according to a preset grouping rule

S330

Perform local feature fusion processing using the feature maps to be locally fused corresponding to an i-th channel in a g-th feature map group and the feature maps to be locally fused corresponding to each channel in the g-th feature map group except the feature maps to be locally fused corresponding to the i-th channel to obtain local fusion feature maps of key points corresponding to the channels of the human body posture recognition model

S340

Determine the fusion posture feature maps based on the local fusion feature maps of key points corresponding to the channels of the human body posture recognition model.

FIG. 7

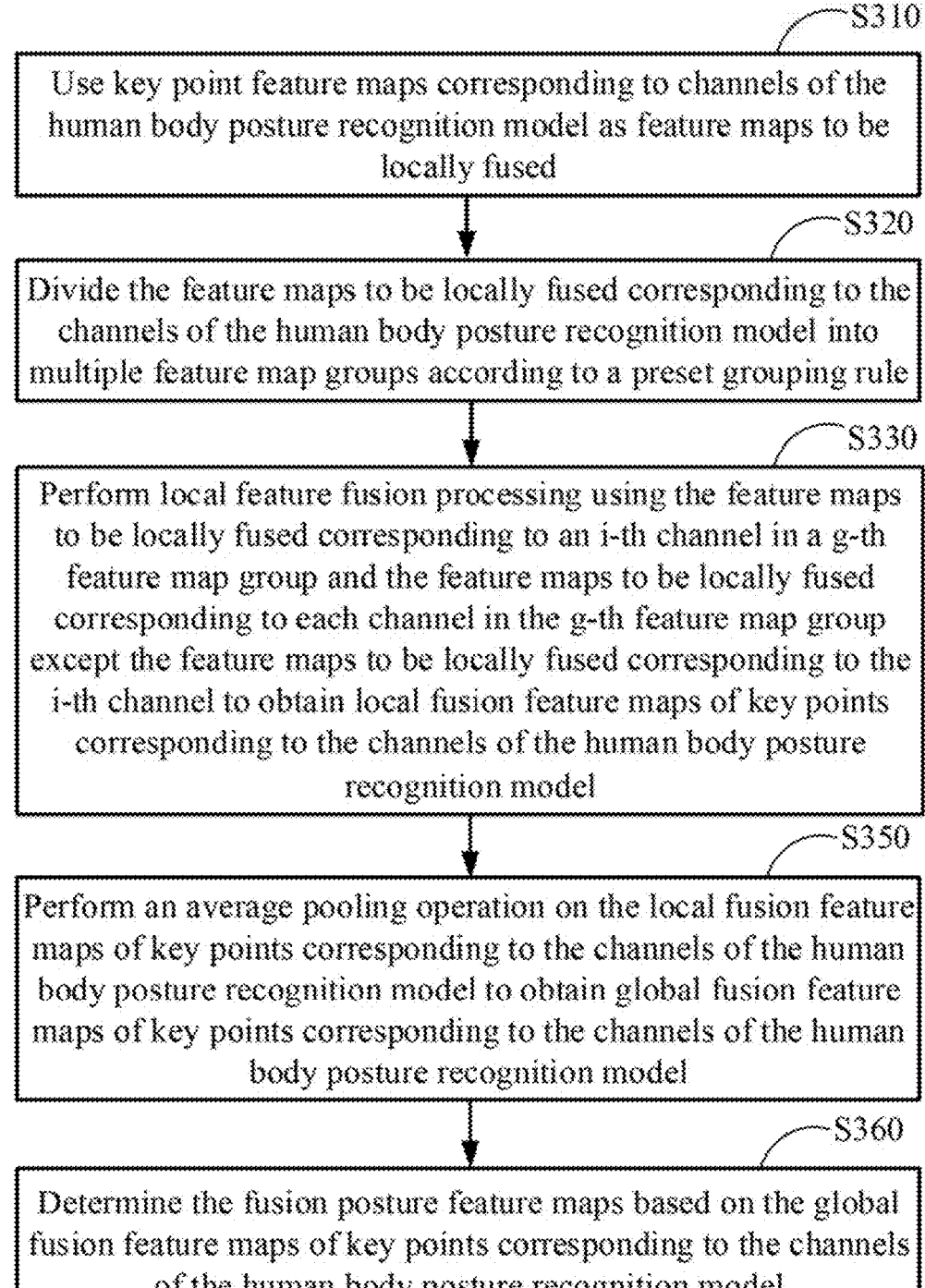

S310

Use key point feature maps corresponding to channels of the human body posture recognition model as feature maps to be locally fused

S320

Divide the feature maps to be locally fused corresponding to the channels of the human body posture recognition model into multiple feature map groups according to a preset grouping rule

S330

Perform local feature fusion processing using the feature maps to be locally fused corresponding to an i-th channel in a g-th feature map group and the feature maps to be locally fused corresponding to each channel in the g-th feature map group except the feature maps to be locally fused corresponding to the i-th channel to obtain local fusion feature maps of key points corresponding to the channels of the human body posture recognition model

S350

Perform an average pooling operation on the local fusion feature maps of key points corresponding to the channels of the human body posture recognition model to obtain global fusion feature maps of key points corresponding to the channels of the human body posture recognition model

S360

Determine the fusion posture feature maps based on the global fusion feature maps of key points corresponding to the channels of the human body posture recognition model

Figure 10:
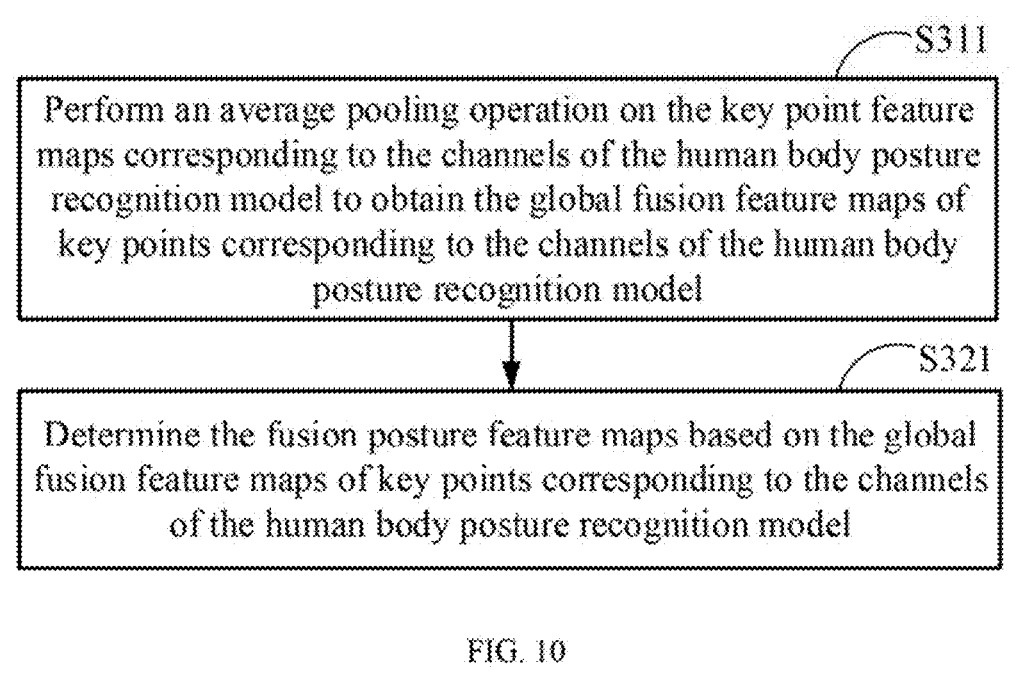

Perform an average pooling operation on the key point feature maps corresponding to the channels of the human body posture recognition model to obtain the global fusion feature maps of key points corresponding to the channels of the human body posture recognition model

S321

Determine the fusion posture feature maps based on the global fusion feature maps of key points corresponding to the channels of the human body posture recognition model

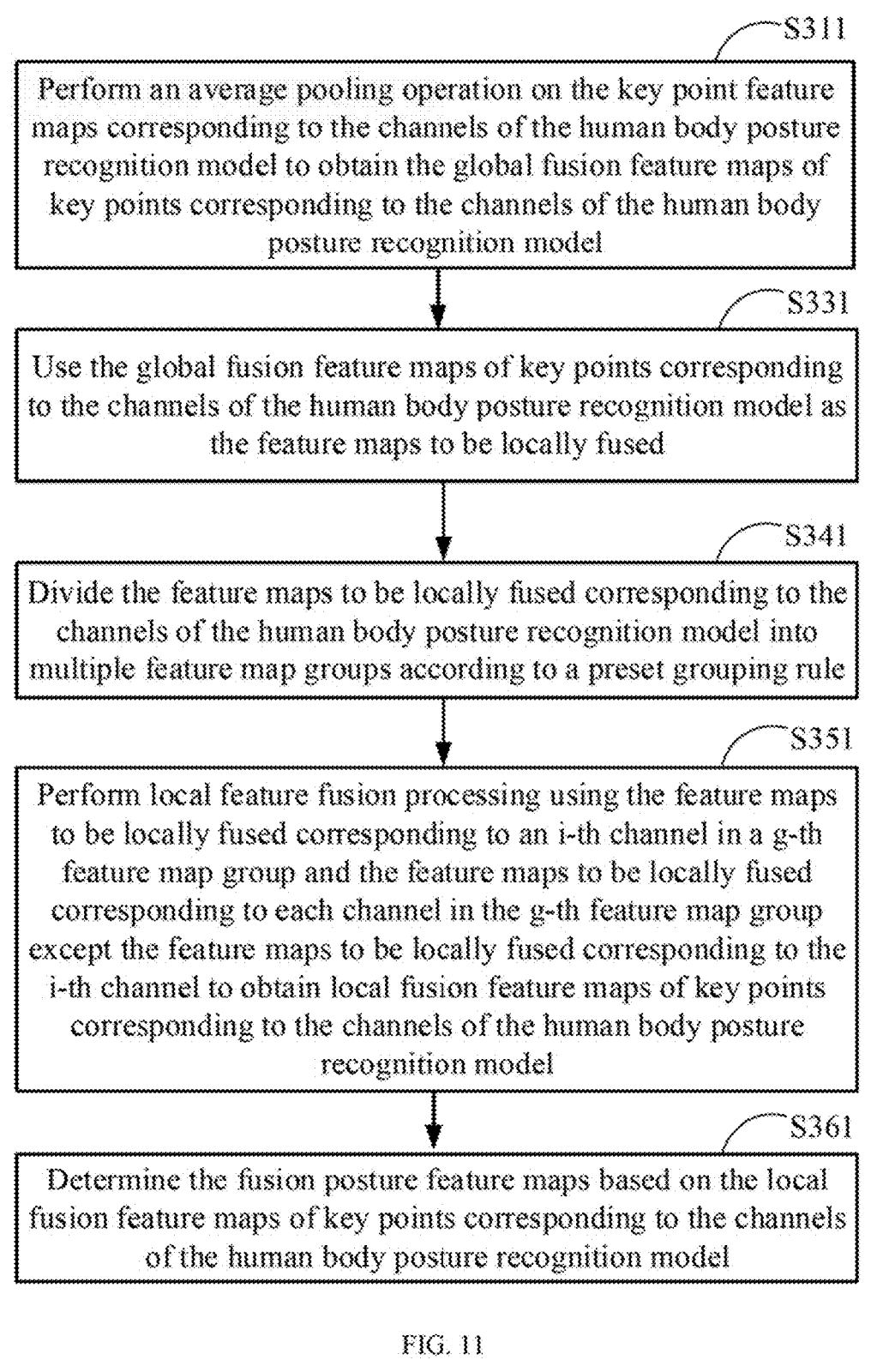

Perform an average pooling operation on the key point feature maps corresponding to the channels of the human body posture recognition model to obtain the global fusion feature maps of key points corresponding to the channels of the human body posture recognition model

S331

Use the global fusion feature maps of key points corresponding to the channels of the human body posture recognition model as the feature maps to be locally fused

S341

Divide the feature maps to be locally fused corresponding to the channels of the human body posture recognition model into multiple feature map groups according to a preset grouping rule

S351

Perform local feature fusion processing using the feature maps to be locally fused corresponding to an i-th channel in a g-th feature map group and the feature maps to be locally fused corresponding to each channel in the g-th feature map group except the feature maps to be locally fused corresponding to the i-th channel to obtain local fusion feature maps of key points corresponding to the channels of the human body posture recognition model

S361

Determine the fusion posture feature maps based on the local fusion feature maps of key points corresponding to the channels of the human body posture recognition model

FIG. 11

METHOD FOR OPTIMIZING HUMAN BODY POSTURE RECOGNITION MODEL, DEVICE AND COMPUTER-READABLE STORAGE MEDIUM

CROSS REFERENCE TO RELATED APPLICATIONS

The present application is a continuation-application of International Application PCT/CN2021/132113, with an international filing date of Nov. 22, 2021, which claims foreign priority to Chinese Patent Application No. 202011590719.7, filed on Dec. 29, 2020 in the China National Intellectual Property Administration, the contents of all of which are hereby incorporated by reference in its entirety.

TECHNICAL FIELD

The present disclosure generally relates to artificial intelligence, and particularly to a method for optimizing a human body posture recognition model, device and computer-readable storage medium.

BACKGROUND

The main task of human posture estimation is to locate the key points (e.g., elbows, wrists, knees, etc.) of a human body from input images, which has certain practical application value in various visual scenarios such as motion recognition and human-computer interaction. In the field of service robots, a human body posture estimation algorithm can allow robots to better understand human actions, which is the basis for robots to understand and analyze various human behaviors. However, some conventional methods directly calculate the error between heat maps and true values, and do not further analyze the heat maps, which results in low recognition accuracy.

Therefore, there is a need to provide a method for optimizing a human body posture recognition model to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 2 is an exemplary flowchart of a method for optimizing a human body posture recognition model according to one embodiment.

FIG. 7 is an exemplary flowchart of a method for optimizing a human body posture recognition model according to another embodiment.

FIG. 9 is an exemplary flowchart of a method for optimizing a human body posture recognition model according to another embodiment.

FIG. 10 is an exemplary flowchart of a method for optimizing a human body posture recognition model according to another embodiment.

FIG. 11 is an exemplary flowchart of a method for optimizing a human body posture recognition model according to another embodiment.

DETAILED DESCRIPTION

Figure 1:
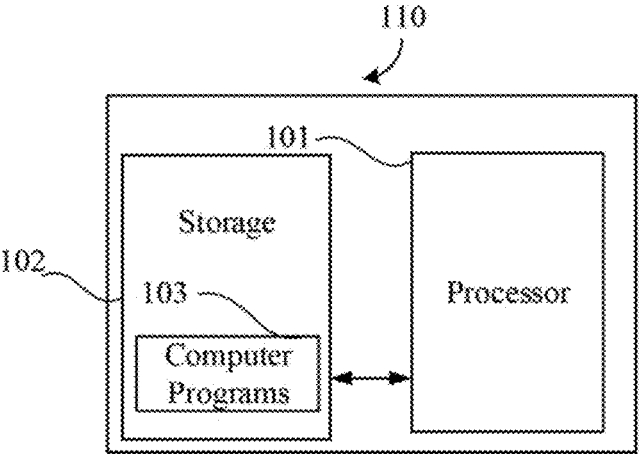
FIG. 1 is a schematic block diagram of a device according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Human body posture estimation algorithms can be mainly divided into two categories: top-down methods and bottom-up approaches. The top-down approach mainly consists of two stages, namely object detection and single-person key point detection. Object detection algorithms are to detect all people in an input image. Single-person key point detection is to estimate the posture of each person in the image, and find the required key points in each cropped person, such as the head, left hand, and right foot. The bottom-up approach mainly consists of two parts, key point detection and key point matching. Key point detection is to locate the unidentified key points of all people in the input image by predicting the heat maps corresponding to different key points. Key point matching is to use some association or matching algorithms (e.g. greedy algorithm, dynamic planning, tag matching, etc.) to connect different key points of different people together to generate different individuals. Both the top-down approach and the bottom-up approach are based on heat maps to regress the positions of the key points. However, they calculate the error between heat maps and true values without analyzing the heat maps (e.g., analyzing the spatial information of the key point heat maps and the relationship between the heat maps).

In order to further improve the expression ability of the human body posture recognition model, the present disclosure proposes a method for optimizing a human body posture recognition model based on multi-layer feature fusion. The present disclosure divides the key points of a human body into five parts according to the structure of human motion. Based on the division of key points, the present disclosure analyzes key point features from three levels: individual level, local level and global level. At the individual level, the spatial expression ability inside the heat map corresponding to each key point is analyzed. At the local level, the information exchange between each key point feature and the key point feature of the area where it is located is analyzed. At the global level, the information exchange between all key point features is analyzed, so that the human body posture recognition model can directly learn the interdependence between the key points. Through the analysis from these three levels, the expression ability of the human body posture recognition model can be greatly improved, thereby improving the performance of the human body posture recognition model.

FIG. 1 shows a schematic block diagram of device 110 according to one embodiment. In one embodiment, the device 110 may be arranged within a robot (e.g., a humanoid robot). The device 110 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of a method for optimizing a human body posture recognition model, such as steps S100 to S500 in FIG. 2, steps S310 to S340 in FIG. 7, steps S310 to S360 in FIG. 9, steps S311 and S321 in FIG. 10, and steps S311 to S361 in FIG. 11 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EE-PROM). The storage 102 may be an internal storage unit of the device 110, such as a hard disk or a memory. The storage 102 may also be an external storage device of the device 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the device 110. The storage 102 can also be used to temporarily store data that have been output or is about to be output.

Figure 12:
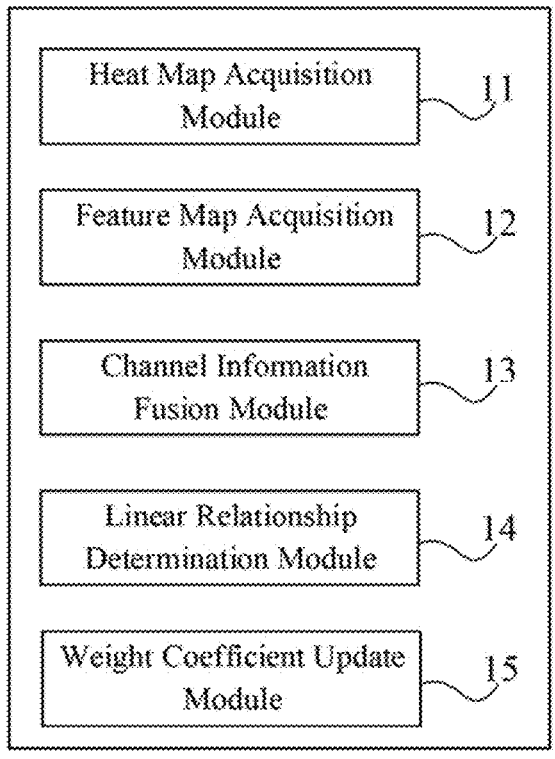
FIG. 12 is schematic block diagram of a human body posture recognition model optimization device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the device 110. For example, the one or more computer programs 103 may be divided into a heat map acquisition module 11, a feature map acquisition module 12, a channel information fusion module 13, a linear relationship determination module 14, and a weight coefficient update module 15 as shown in FIG. 12.

It should be noted that the block diagram shown in FIG. 1 is only an example of the device 110. The device 110 may include more or fewer components than what is shown in FIG. 1, or have a different configuration than what is shown in FIG. 1. Each component shown in FIG. 1 may be implemented in hardware, software, or a combination thereof.

FIG. 2 is a schematic flowchart of a method for optimizing a human body posture recognition model according to one embodiment. As an example, but not a limitation, the method can be implemented by the device 110. The method may include the following steps.

Step S100: Obtain heat maps including a predetermined number of key points of a human body by using a preset posture estimation algorithm.

Figure 3:
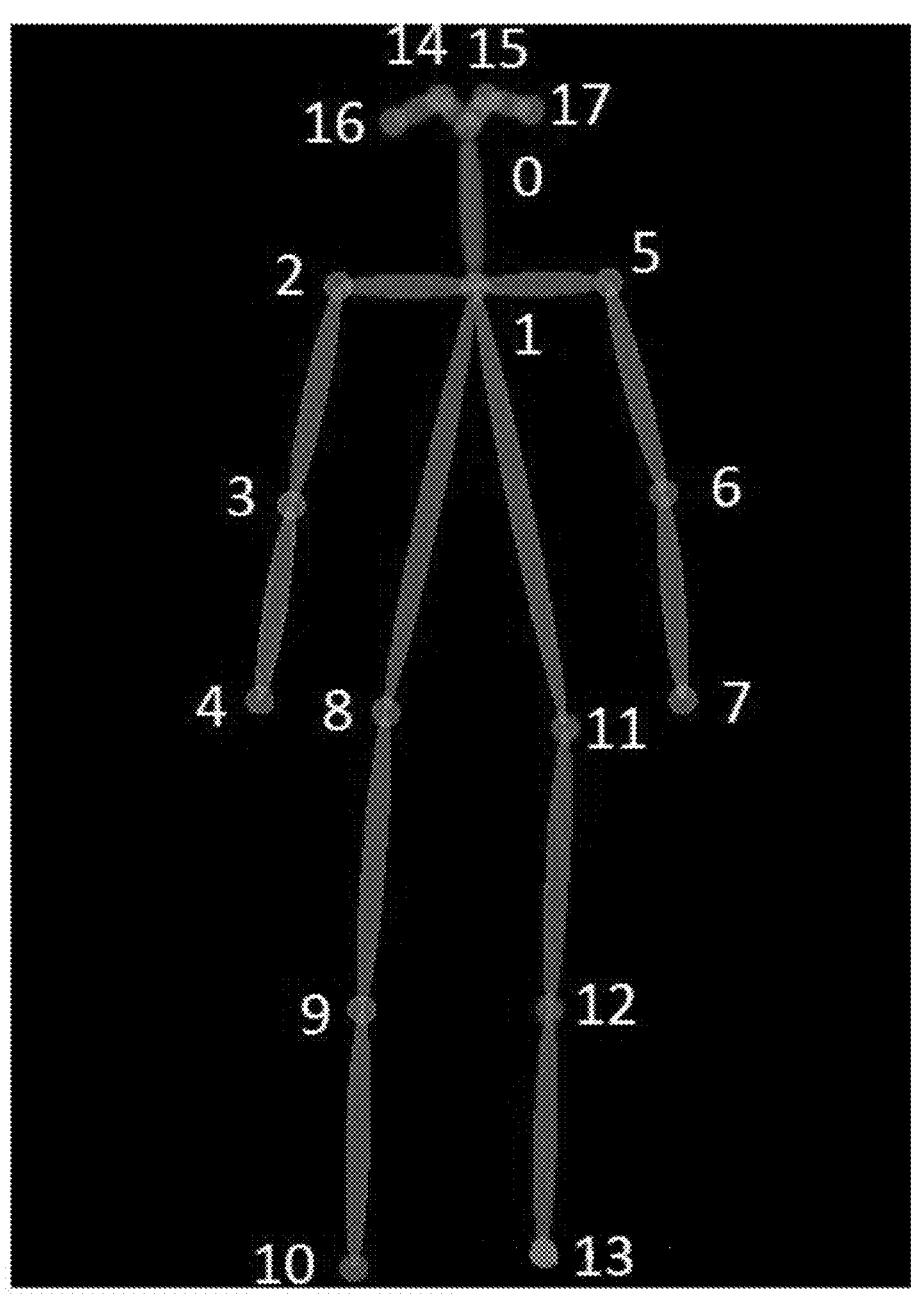
FIG. 3 is a schematic diagram showing 18 key points of a human body.
Figure 4:
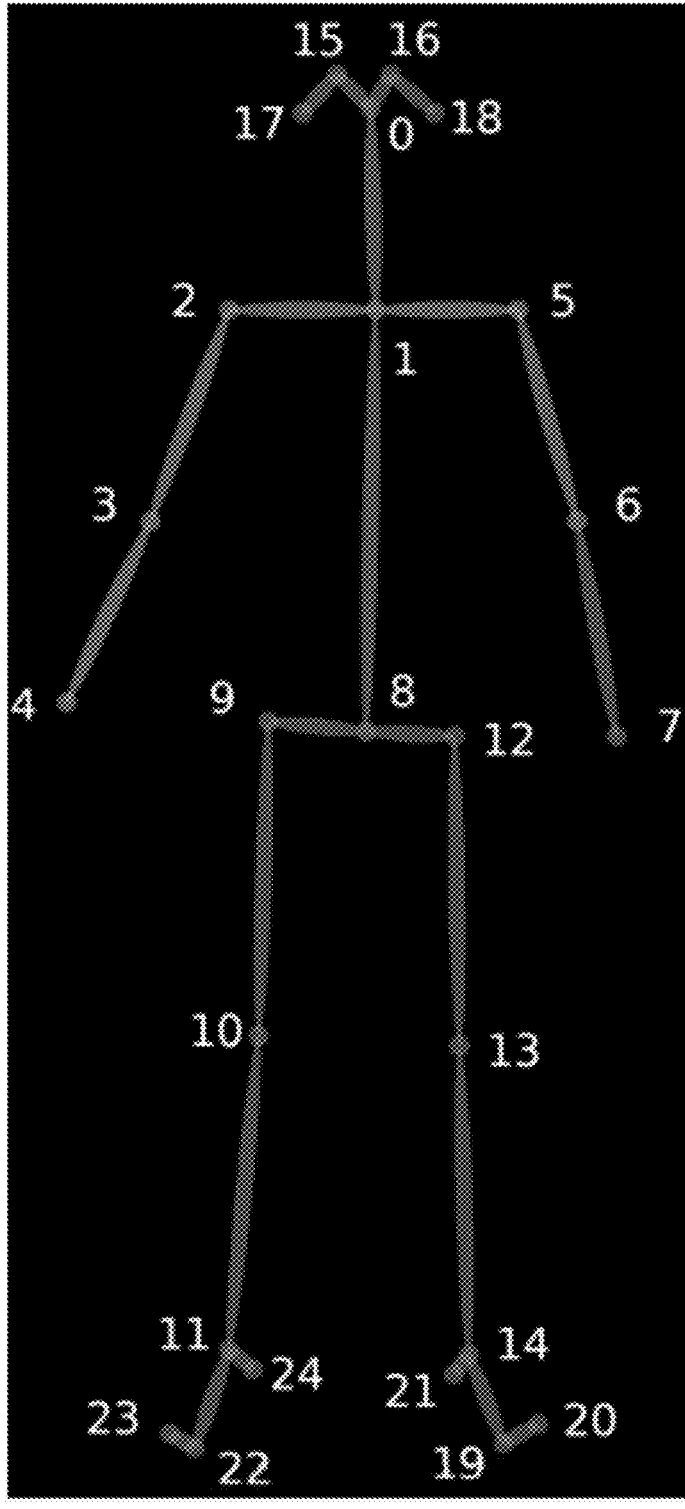
FIG. 4 is a schematic diagram showing 25 key points of a human body.

The preset posture estimation algorithm can be HRNet, Openpose, etc., and the human body posture heat maps including a predetermined number of key points can be obtained by using the preset posture estimation algorithm. For example, Openpose can obtain human body posture heat maps including 18 key points. As shown in FIG. 3, the 18 key points may correspond to right ear, left ear, right eye, left eye, nose, neck, right shoulder, right elbow, right hand, left shoulder, left elbow, left hand, right hip, right knee, right ankle, left hip, left knee and left ankle of a person in an image. As shown in FIG. 4, Openpose can obtain human body posture heat maps including 25 key points. The 25 key points may correspond to right ear, left ear, right eye, left eye, nose, neck, right shoulder, right elbow, right hand, left shoulder, left elbow, left hand, right hip, right knee, right ankle, left hip, left knee, left ankle, left big toe, left little toe, left heel, right big toe, right little toe and right heel. Each key point can be expressed in the form of coordinates, each key point corresponds to a specific reference number, and each reference number corresponds to a specific key part of the human body.

The predetermined number can be determined according to the action to be recognized by the human body posture recognition model. It can be understood that if the action to be recognized by the human body posture recognition model has nothing to do with the left big toe, left little toe, left heel, right big toe, right little toe and right heel, the preset posture estimation algorithm can be used to obtain human body posture heat maps including the 18 key points. If the action to be recognized by the human posture recognition model is related to the left big toe, left little toe, left heel, right big toe, right little toe and right heel, for example, when it needs to determine the direction and orientation of the human body posture, the preset posture estimation algorithm can then be used to obtain human body posture heat maps including the 25 key points. The direction and orientation of the human body posture can then be determined based on the left big toe, the left little toe, the left heel, the right big toe, the right little toe and the right heel.

Step S200: Perform depth separable convolution on a feature map corresponding to one of the heat maps corresponding to each of the key points and a convolution kernel of a corresponding channel of the human body posture recognition model to determine a key point feature map corresponding to each channel of the human body posture recognition model.

The number of the key points in the heat maps is the same as the channels of the human body posture recognition model. Each channel of the human body posture recognition model corresponds to a convolution kernel, and the convolution kernel corresponding to each channel is different. Each channel of the human body posture recognition model can use a corresponding convolution kernel to perform depth-separable convolution on the feature map corresponding to the heat map corresponding to a key point to determine the key point feature map corresponding to each channel.

In one embodiment, when the number of key points in the heat maps is C, and the number of channels of the human body posture recognition model is C, the size of a heat map X is C*H*W, X=[x1, x2, x3, . . . , xC], and the size of xc is H*W, c≤C. Depth separable convolution is performed on xc and the convolution kernel corresponding to the c-th channel of the human body posture recognition model to determine the key point feature map $U^1[c]$ corresponding to the c-th channel.

It can be understood that step S200 performs feature description at the individual level, uses depth-separable convolution to describe the spatial features inside the feature map corresponding to the heat map corresponding to each key point, and analyzes the respective features of each channel.

Step S300: Perform local feature fusion processing and/or global feature fusion processing on the key point feature map corresponding to each channel of the human body posture recognition model to obtain fusion posture feature maps.

Exemplarily, after using the depth-separable convolution to describe the internal spatial features of the feature map corresponding to the heat map corresponding to each key point, local feature fusion processing can be performed on the key point feature map corresponding to each channel. That is, the key point feature maps corresponding to each channel are divided into multiple feature map groups according to a human motion rule. Each feature map group is described separately, and the feature information inside each group of key points is described by using local feature fusion processing, which can effectively analyze the information interaction in each group of key point features.

Figure 5:
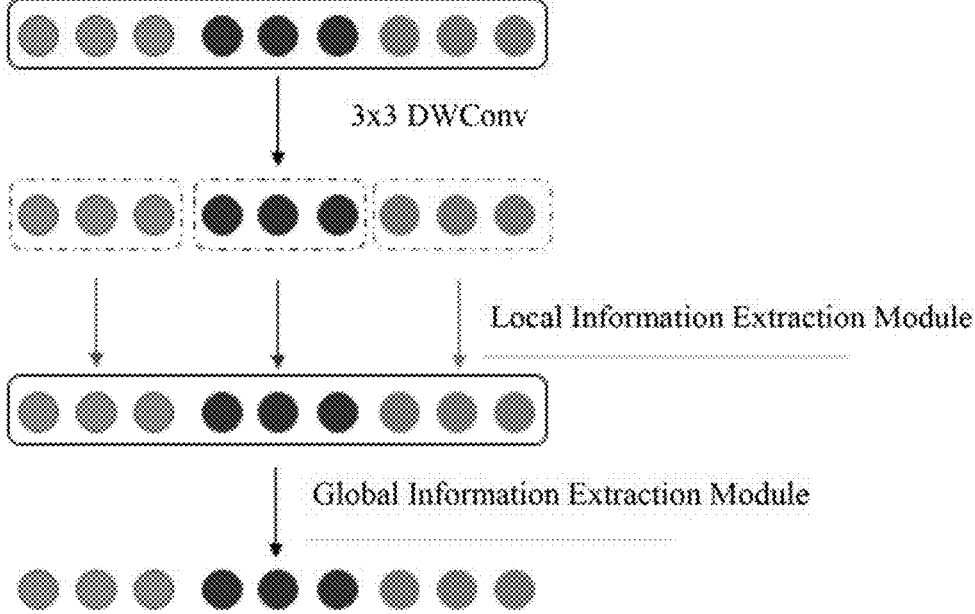
FIG. 5 is a schematic diagram showing multi-layer feature extraction according to one embodiment.
Figure 6:
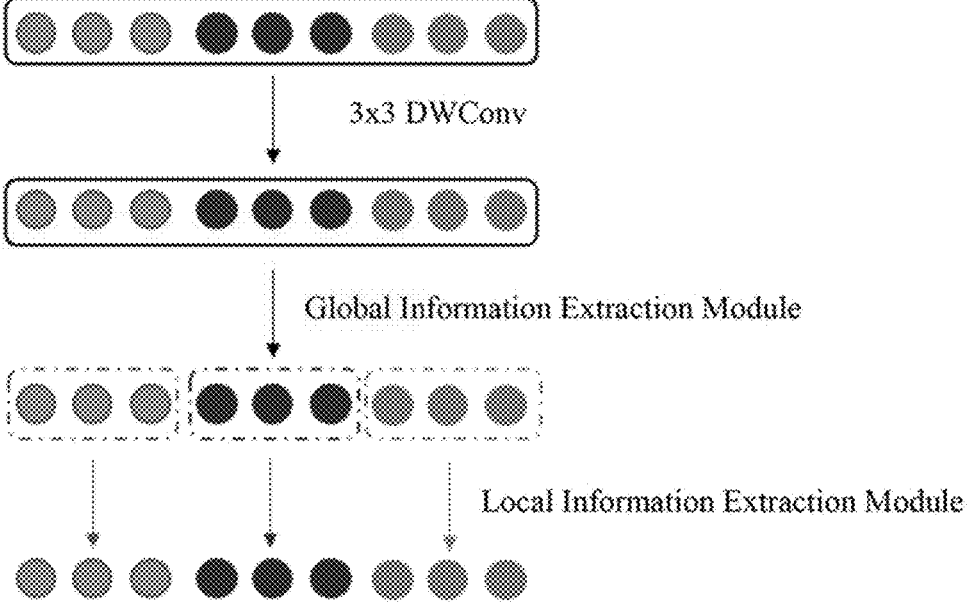
FIG. 6 is a schematic diagram showing multi-layer feature extraction according to another embodiment.

In one embodiment, as shown in FIG. 5, after the local feature fusion processing is performed on the key point feature maps corresponding to the channels, the global feature fusion processing is performed on the feature maps on which the local feature fusion processing has been performed. Alternatively, as shown in FIG. 6, after the global feature fusion processing is performed on the key point feature maps corresponding to the channels, the local feature fusion processing is performed on the feature maps on which all feature information fusion processing has been performed. The feature description is performed from both the local level and the global level, which can not only analyze the information interaction in each group of key point features, but also effectively analyze the information interaction of all key point features.

S400: Determine a linear relationship between the channels of the human body posture recognition model based on the fusion posture feature maps.

In order to further obtain the relationship between different channels, the nonlinear relationship between the channels is learned, and since the learned relationship is not mutually exclusive, the linear relationship between the channels can be determined according to the following equation: $s=\sigma(W_2\delta(W_1z))$, where s represents the linear relationship between the channels of the human body posture recognition model, δ represents ReLU function, σ represents sigmoid activation function, $W_1\in R^{C\times C}$ and $W_2\in R^{C\times C}$, which represents two fully connected layers, C represents a total number of channels of the human posture recognition model, and z represents the fusion posture feature maps. The fusion pose feature maps consist of the fusion maps of the key points corresponding to each channel, which can be expressed as z=[z[1], z[2], . . . , z[C]], C represents a total number of channels of the human posture recognition model, z[c] represents the fusion map of the key point corresponding to the c-th channel, c≤C.

Step S500: Update weight coefficients of the corresponding channels of the human body posture recognition model by using the linear relationship between the channels of the human body posture recognition model.

The linear relationship s=[s[1], s[2], . . . , s[C]] between the channels can be regarded as the importance of each feature channel after feature selection, which is weighted to the previous features by multiplication channel by channel to complete the update of the original features in the channel dimension, which can be expressed as follows: $\tilde{x}_c=s[c]u[c]$. In one embodiment, $X=[\tilde{x}_1, \tilde{x}_2, . . . , \tilde{x}_C]$. The whole operation can be regarded as learning the weight coefficients of each channel, which makes the model more discriminative to the characteristics of each channel.

By implementing the method described in the embodiments above, the key point features are analyzed from at least two levels: individual level, local level and/or global level. At the individual level, the spatial expression ability inside the heat map corresponding to each key point is analyzed. At the local level, the information exchange between each key point feature and the key point feature of the area where it is located is analyzed. At the global level, the information exchange between all key point features is analyzed, so that the human body posture recognition model can directly learn the interdependence between the key points. Through the analysis from the at least two levels, the expression ability of the human body posture recognition model can be greatly improved, thereby improving the performance of the human body posture recognition model.

Referring to FIG. 7, in one embodiment, the local feature fusion processing can be performed as follows.

Step S310: Use key point feature maps corresponding to channels of the human body posture recognition model as feature maps to be locally fused.

The number of feature maps corresponding to key points is the same as the number of feature maps to be locally fused, and they correspond to each other one by one.

Step S320: Divide the feature maps to be locally fused corresponding to the channels of the human body posture recognition model into multiple feature map groups according to a preset grouping rule.

Figure 8:
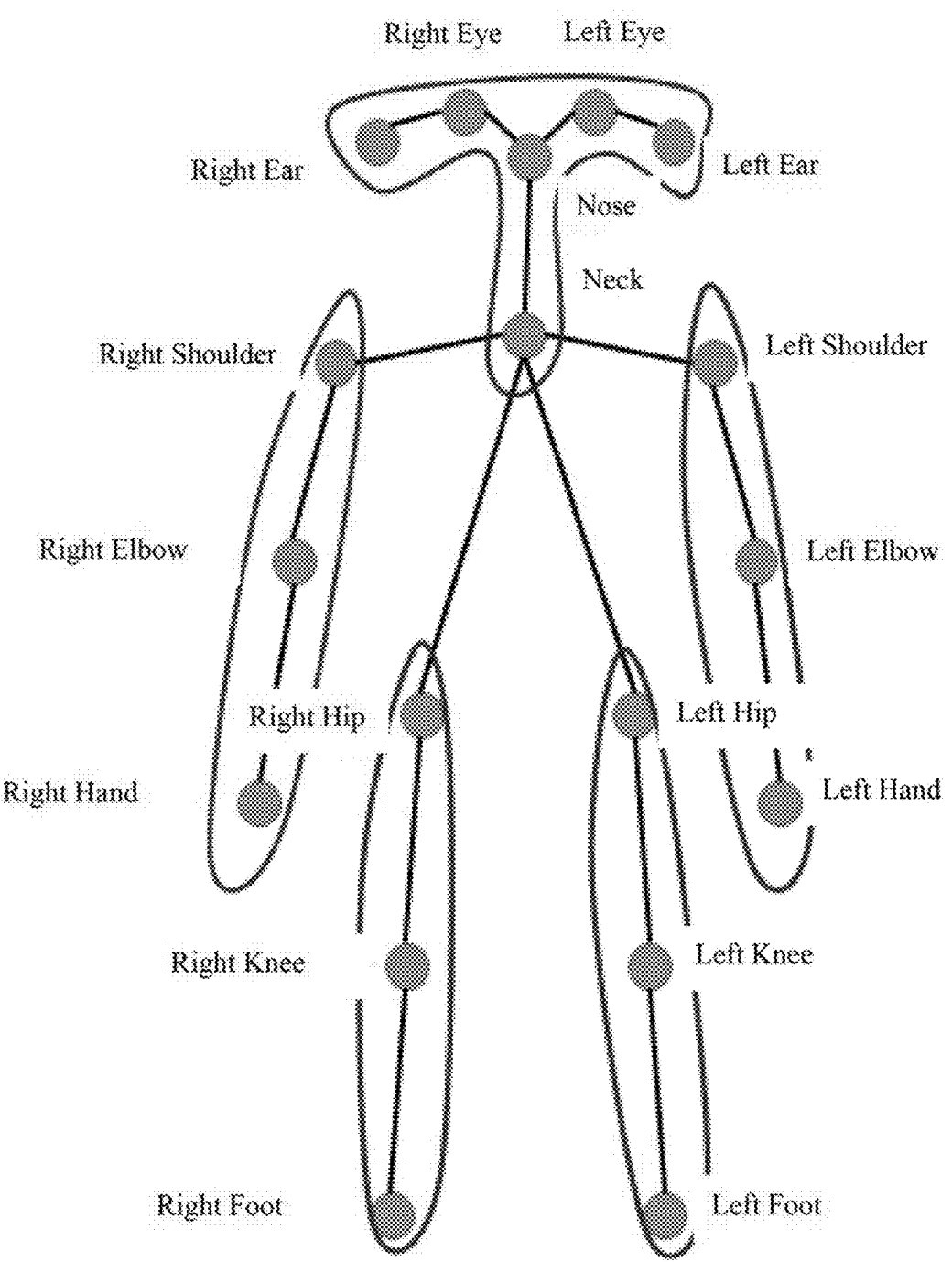
FIG. 8 is a schematic diagram showing 18 key points of a human body that are divided into five groups.

Exemplarily, if the preset posture estimation algorithm obtains human body posture heat maps including 18 key points, the 18 key points can be divided into 5 groups. Specifically, as shown in FIG. 8, the key points corresponding to the right ear, left ear, right eye, left eye, nose and neck are classified into the first group. The key points corresponding to the right shoulder, right elbow and right hand are classified into the second group. The key points corresponding to the left shoulder, left elbow and left hand are classified into the third group. The key points corresponding to the right hip, right knee and right ankle are classified into the fourth group. The key points corresponding to the left hip, left knee and left ankle are classified into the fifth group.

In another embodiment, if the preset posture estimation algorithm obtains human body posture heat maps including 25 key points, the 25 key points can be divided into 7 groups. In addition to the five groups described above, the key points corresponding to the left big toe, left little toe, and left heel are classified into the sixth group, and the key points corresponding to the right big toe, right little toe, and left heel are classified into the seventh group.

Step S330: Perform local feature fusion processing using the feature maps to be locally fused corresponding to an i-th channel in a g-th feature map group and the feature maps to be locally fused corresponding to each channel in the g-th feature map group except the feature maps to be locally fused corresponding to the i-th channel to obtain local fusion feature maps of key points corresponding to the channels of the human body posture recognition model.

In one embodiment, local feature fusion processing is performed according to the following equation:

$$U_g[i] = U_g^1[i] + f(U_g^1[\Omega_g \backslash i]),$$

where $U_g[i]$ represents local fusion feature maps of key points corresponding to the i-th channel in the g-th feature map group, $\Omega_g$ represents the set of key points of the g-th feature map group, $$U_g^1[\Omega_g \backslash i]$$

channel in the g-th feature map group except the feature maps to be locally fused corresponding to the i-th channel, f( ) represents convolution operation, $$U_g^1[i]$$

represents the feature maps to be locally fused corresponding to the i-th channel in the g-th feature map group, $1 \leq i \leq N$, N represents a total number of key points included in the set of key points of the g-th feature map group, $g \leq G$, and G represents an amount of the feature map groups.

The feature map corresponding to the g-th feature map group can be expressed as $U_g = [U_g[1], U_g[2], \ldots, U_g[N]]$, and the feature maps corresponding to the G feature map groups can be expressed as $U = [U1, U2, \ldots UG]$.

Step S340: Determine the fusion posture feature maps based on the local fusion feature maps of key points corresponding to the channels of the human body posture recognition model.

It should be noted that the feature maps (i.e., U=[U1, U2, . . . UG]) corresponding to G feature map groups are composed of local fusion feature maps of the key points corresponding to each channel. The dimension of U is the same as that of the fusion posture feature maps, and U can be used to represent the fusion posture feature maps.

Local feature fusion is to describe the features of each feature map group separately. Using local feature fusion to describe the feature information inside each group of key points can effectively analyze the information interaction in the features of each group of key points.

Referring to FIG. 9, in one embodiment, after the local feature fusion processing, the global feature fusion processing may include the following steps.

Step S310: Use key point feature maps corresponding to channels of the human body posture recognition model as feature maps to be locally fused.

Step S320: Divide the feature maps to be locally fused corresponding to the channels of the human body posture recognition model into multiple feature map groups according to a preset grouping rule.

Step S330: Perform local feature fusion processing using the feature maps to be locally fused corresponding to an i-th channel in a g-th feature map group and the feature maps to be locally fused corresponding to each channel in the g-th feature map group except the feature maps to be locally fused corresponding to the i-th channel to obtain local fusion feature maps of key points corresponding to the channels of the human body posture recognition model.

Step S350: Perform an average pooling operation on the local fusion feature maps of key points corresponding to the channels of the human body posture recognition model to obtain global fusion feature maps of key points corresponding to the channels of the human body posture recognition model.

The average pooling operation of the local fusion feature maps of key points corresponding to the c-th channel can be expressed by the following equation:

$$z_c = \frac{1}{H \times W} \sum_{\square=1}^{H} \sum_{w=1}^{W} u_c(\square, w),$$

where $u_c(h, w)$ represents the feature values of the pixel at the h-th row and w-th column of the local fusion feature map of key point corresponding to the c-th channel, the dimension of the local fusion feature map of key point corresponding to the c-th channel is H*W, and zc represents the global fusion feature map of key point corresponding to the c-th channel.

Step S360: Determine the fusion posture feature maps based on the global fusion feature maps of key points corresponding to the channels of the human body posture recognition model.

The fusion posture feature maps are composed of the global fusion feature map of key points corresponding to each channel, which can be expressed as z=[z[1], z[2], . . . , z[C]], C is the total number of channels of the human posture recognition model, z[c]=zc, which means the global fusion feature map of the key points corresponding to the c-th channel, $c \leq C$.

Referring to FIG. 10, in one embodiment, the global feature fusion processing may include the following steps.

Step S311: Perform an average pooling operation on the key point feature maps corresponding to the channels of the human body posture recognition model to obtain the global fusion feature maps of key points corresponding to the channels of the human body posture recognition model.

The average pooling operation of the key point feature maps corresponding to the c-th channel can be expressed by the following equation:

$$z_c = \frac{1}{H \times W} \sum_{\square=1}^{H} \sum_{w=1}^{W} u_c(\square, w),$$

where $u_c(h, w)$ represents the feature values of the pixel at the h-th row and w-th column of the key point feature map corresponding to the c-th channel, the dimension of the key point feature map corresponding to the c-th channel is H*W, and zc represents the global fusion feature map of key point corresponding to the c-th channel.

Step S321: Determine the fusion posture feature maps based on the global fusion feature maps of key points corresponding to the channels of the human body posture recognition model.

The fusion posture feature maps can be expressed as $z=[z[1], z[2], \ldots, z[C]]$, where C is the total number of channels of the human posture recognition model, $z[c]=zc$, which means the global fusion feature map of the key points corresponding to the c-th channel, $c \leq C$.

Referring to FIG. 11, in one embodiment, after obtaining the global fusion feature maps, the local feature fusion processing may include the following steps.

Step S311: Perform an average pooling operation on the key point feature maps corresponding to the channels of the human body posture recognition model to obtain the global fusion feature maps of key points corresponding to the channels of the human body posture recognition model.

Step S331: Use the global fusion feature maps of key points corresponding to the channels of the human body posture recognition model as the feature maps to be locally fused.

Step S341: Divide the feature maps to be locally fused corresponding to the channels of the human body posture recognition model into multiple feature map groups according to a preset grouping rule.

Step S351: Perform local feature fusion processing using the feature maps to be locally fused corresponding to an i-th channel in a g-th feature map group and the feature maps to be locally fused corresponding to each channel in the g-th feature map group except the feature maps to be locally fused corresponding to the i-th channel to obtain local fusion feature maps of key points corresponding to the channels of the human body posture recognition model.

Step S361: Determine the fusion posture feature maps based on the local fusion feature maps of key points corresponding to the channels of the human body posture recognition model.

It should be understood that sequence numbers of the foregoing processes do not mean particular execution sequences. The execution sequences of the processes should be determined based on functions and internal logic of the processes, and should not be construed as any limitation on the implementation processes of the embodiments of the present disclosure.

Referring to FIG. 12, in one embodiment, a human body posture recognition model optimization device 10 includes a heat map acquisition module 11, a feature map acquisition module 12, a channel information fusion module 13, a linear relationship determination module 14, and a weight coefficient update module 15.

The heat map acquisition module 11 is to obtain heat maps including a predetermined number of key points of a human body by using a preset posture estimation algorithm. The feature map acquisition module 12 is to perform depth separable convolution on a feature map corresponding to one of the heat maps corresponding to each of the key points and a convolution kernel of a corresponding channel of the human body posture recognition model to determine a key point feature map corresponding to each channel of the human body posture recognition model. The channel information fusion module 13 is to perform local feature fusion processing and/or global feature fusion processing on the key point feature map corresponding to each channel of the human body posture recognition model to obtain fusion posture feature maps. The linear relationship determination module 14 is to determine a linear relationship between the channels of the human body posture recognition model based on the fusion posture feature maps. The weight coefficient update module 15 is to update weight coefficients of the corresponding channels of the human body posture recognition model by using the linear relationship between the channels of the human body posture recognition model.

In one embodiment, the channel information fusion module 13 may only be used to perform local feature fusion processing on the key point feature maps corresponding to the channels. For example, performing local feature fusion processing on the key point feature maps corresponding to the channels may include the following steps: using key point feature maps corresponding to channels of the human body posture recognition model as feature maps to be locally fused; dividing the feature maps to be locally fused corresponding to the channels of the human body posture recognition model into multiple feature map groups according to a preset grouping rule; performing local feature fusion processing using the feature maps to be locally fused corresponding to an i-th channel in a g-th feature map group and the feature maps to be locally fused corresponding to each channel in the g-th feature map group except the feature maps to be locally fused corresponding to the i-th channel to obtain local fusion feature maps of key points corresponding to the channels of the human body posture recognition model; and determining the fusion posture feature maps based on the local fusion feature maps of key points corresponding to the channels of the human body posture recognition model.

In one embodiment, the channel information fusion module 13 can be used only to perform global feature fusion processing on the key point feature maps corresponding to the channels, and performing global feature fusion processing on the key point feature maps corresponding to the channels may include the following steps: performing an average pooling operation on the local fusion feature maps of key points corresponding to the channels of the human body posture recognition model to obtain global fusion feature maps of key points corresponding to the channels of the human body posture recognition model; and determining the fusion posture feature maps based on the global fusion feature maps of key points corresponding to the channels of the human body posture recognition model.

In one embodiment, the channel information fusion module 13 can perform local feature fusion processing and global feature fusion processing on the key point feature maps corresponding to the channels.

In one embodiment, after performing local feature fusion processing on the key point feature maps corresponding to the channels, the global feature fusion processing may include the following steps: using key point feature maps corresponding to channels of the human body posture recognition model as feature maps to be locally fused; dividing the feature maps to be locally fused corresponding to the channels of the human body posture recognition model into multiple feature map groups according to a preset grouping rule; performing local feature fusion processing using the feature maps to be locally fused corresponding to an i-th channel in a g-th feature map group and the feature maps to be locally fused corresponding to each channel in the g-th feature map group except the feature maps to be locally fused corresponding to the i-th channel to obtain local fusion feature maps of key points corresponding to the channels of the human body posture recognition model; and determining the fusion posture feature maps based on the local fusion feature maps of key points corresponding to the channels of the human body posture recognition model.

In one embodiment, after performing global feature fusion processing on the key point feature maps corresponding to the channels, the local feature fusion processing may include the following steps: performing an average pooling operation on the key point feature maps corresponding to the channels of the human body posture recognition model to obtain the global fusion feature maps of key points corresponding to the channels of the human body posture recognition model; using the global fusion feature maps of key points corresponding to the channels of the human body posture recognition model as the feature maps to be locally fused; dividing the feature maps to be locally fused corresponding to the channels of the human body posture recognition model into multiple feature map groups according to a preset grouping rule; performing local feature fusion processing using the feature maps to be locally fused corresponding to an i-th channel in a g-th feature map group and the feature maps to be locally fused corresponding to each channel in the g-th feature map group except the feature maps to be locally fused corresponding to the i-th channel to obtain local fusion feature maps of key points corresponding to the channels of the human body posture recognition model; and determine the fusion posture feature maps based on the local fusion feature maps of key points corresponding to the channels of the human body posture recognition model.

In one embodiment, the local feature fusion processing is performed according to the following equation:

$$U_g[i] = U_g^1[i] + f(U_g^1[\Omega_g \backslash i]),$$

where $U_g[i]$ represents local fusion feature maps of key points corresponding to an i-th channel in a g-th feature map group, $$U_g^1[\Omega_g \backslash i]$$

represents the feature maps to be locally fused corresponding to each channel in the g-th feature map group except the feature maps to be locally fused corresponding to the i-th channel, f( ) represents convolution operation, $$U_g^1[i]$$

represents the feature maps to be locally fused corresponding to the i-th channel in the g-th feature map group, $1 \leq i \leq N$, N represents a total number of key points included in a key point set of the g-th feature map group, $g \leq G$, and G represents an amount of the feature map groups.

In one embodiment, the linear relationship between the channels of the human body posture recognition model is determined according to the following equation: $s = \sigma(W_2 \delta(W_1 z))$, where s represents the linear relationship between the channels of the human body posture recognition model, $\delta$ represents ReLU function, $\sigma$ represents sigmoid activation function, $W_1 \in R^{C \times C}$ and $W_2 \in R^{C \times C}$, which represents two fully connected layers, C represents a total number of channels of the human posture recognition model, and z represents the fusion posture feature maps.

In one embodiment, the feature map groups may include: a first group that includes the key points corresponding to a right ear, a left ear, a right eye, a left eye, a nose and a neck; a second group that includes the key points corresponding to a right shoulder, a right elbow and a right hand; a third group that includes the key points corresponding to a left shoulder, a left elbow and a left hand; a fourth group that includes the key points corresponding to a right hip, a right knee and a right ankle; and a fifth group that includes the key points corresponding to a left hip, a left knee and a left ankle.

The device 10 can execute the method for optimizing the human body posture recognition model described in the above-mentioned embodiments. It should be noted that the basic principles and technical effects of the device are the same as the aforementioned method. For a brief description, for parts not mentioned in this device embodiment, reference can be made to corresponding description in the method embodiments.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part, in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/ terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for optimizing a human body posture recognition model, the method comprising:

obtaining heat maps comprising a predetermined number of key points of a human body by using a preset posture estimation algorithm;

performing depth separable convolution on a feature map corresponding to one of the heat maps corresponding to each of the key points and a convolution kernel of a corresponding channel of the human body posture recognition model to determine a key point feature map corresponding to each channel of the human body posture recognition model;

performing local feature fusion processing and/or global feature fusion processing on the key point feature map corresponding to each channel of the human body posture recognition model to obtain fusion posture feature maps;

determining a linear relationship between the channels of the human body posture recognition model based on the fusion posture feature maps; and updating weight coefficients of the corresponding channels of the human body posture recognition model by using the linear relationship between the channels of the human body posture recognition model;

wherein performing local feature fusion processing on the key point feature map corresponding to each channel of the human body posture recognition model comprises:

using key point feature maps corresponding to channels of the human body posture recognition model as feature maps to be locally fused;

dividing the feature maps to be locally fused corresponding to the channels of the human body posture recognition model into multiple feature map groups according to a preset grouping rule;

performing local feature fusion processing using the feature maps to be locally fused corresponding to an i-th channel in a g-th feature map group and the feature maps to be locally fused corresponding to each channel in the g-th feature map group except the feature maps to be locally fused corresponding to the i-th channel to obtain local fusion feature maps of key points corresponding to the channels of the human body posture recognition model; and determining the fusion posture feature maps based on the local fusion feature maps of key points corresponding to the channels of the human body posture recognition model.

2. The method of claim 1, wherein after obtaining the local fusion feature maps of key points corresponding to the channels of the human body posture recognition model, performing global feature fusion processing comprises:

performing an average pooling operation on the local fusion feature maps of key points corresponding to the channels of the human body posture recognition model to obtain global fusion feature maps of key points corresponding to the channels of the human body posture recognition model; and determining the fusion posture feature maps based on the global fusion feature maps of key points corresponding to the channels of the human body posture recognition model.

3. The method of claim 1, wherein performing global feature fusion processing on the key point feature map corresponding to each channel of the human body posture recognition model comprises:

performing an average pooling operation on the key point feature maps corresponding to channels of the human body posture recognition model to obtain global fusion feature maps of key points corresponding to the channels of the human body posture recognition model; and determining the fusion posture feature maps based on the global fusion feature maps of key points corresponding to the channels of the human body posture recognition model.

4. The method of claim 3, wherein after obtaining the global fusion feature maps of key points corresponding to the channels of the human body posture recognition model, performing local feature fusion processing comprises:

using global fusion feature maps of key points corresponding to channels of the human body posture recognition model as feature maps to be locally fused;

dividing the feature maps to be locally fused corresponding to the channels of the human body posture recognition model into multiple feature map groups according to a preset grouping rule;

performing local feature fusion processing using the feature maps to be locally fused corresponding to an i-th channel in a g-th feature map group and the feature maps to be locally fused corresponding to each channel in the g-th feature map group except the feature maps to be locally fused corresponding to the i-th channel to obtain local fusion feature maps of key points corresponding to the channels of the human body posture recognition model; and determining the fusion posture feature maps based on the local fusion feature maps of key points corresponding to the channels of the human body posture recognition model.

5. The method of claim 1, wherein local feature fusion processing is performed according to the following equation:

$$U_g[i] = U_g^1[i] + f(U_g^1[\Omega_g \backslash i]),$$

where $U_g[i]$ represents local fusion feature maps of key points corresponding to an i-th channel in a g-th feature map group, $$U_g^1[\Omega_g \backslash i$$

represents the feature maps to be locally fused corresponding to each channel in the g-th feature map group except the feature maps to be locally fused corresponding to the i-th channel, f( ) represents convolution operation, $$U_g^1[i]$$

represents the feature maps to be locally fused corresponding to the i-th channel in the g-th feature map group, $1 \leq i \leq N$, N represents a total number of key points included in a key point set of the g-th feature map group, $g \leq G$, and G represents an amount of the feature map groups.

6. The method of claim 1, wherein the feature map groups comprise: a first group that comprises the key points corresponding to a right ear, a left ear, a right eye, a left eye, a nose and a neck; a second group that comprises the key points corresponding to a right shoulder, a right elbow and a right hand; a third group that comprises the key points corresponding to a left shoulder, a left elbow and a left hand; a fourth group that comprises the key points corresponding to a right hip, a right knee and a right ankle; and a fifth group that comprises the key points corresponding to a left hip, a left knee and a left ankle.

7. The method of claim 1, wherein the linear relationship between the channels of the human body posture recognition model is determined according to the following equation: $s=\sigma(W_2\delta(W_1z))$, where s represents the linear relationship between the channels of the human body posture recognition model, $\delta$ represents ReLU function, $\sigma$ represents sigmoid activation function, $W_1 \in R^{C \times C}$ and $W_2 \in R^{C \times C}$, which represents two fully connected layers, C represents a total number of channels of the human posture recognition model, and z represents the fusion posture feature maps.

8. A device comprising:
one or more processors; and
a memory coupled to the one or more processors, the memory storing programs that, when executed by the one or more processors, cause performance of operations comprising:
obtaining heat maps comprising a predetermined number of key points of a human body by using a preset posture estimation algorithm;
performing depth separable convolution on a feature map corresponding to one of the heat maps corresponding to each of the key points and a convolution kernel of a corresponding channel of a human body posture recognition model to determine a key point feature map corresponding to each channel of the human body posture recognition model;
performing local feature fusion processing and/or global feature fusion processing on the key point feature map corresponding to each channel of the human body posture recognition model to obtain fusion posture feature maps;
determining a linear relationship between the channels of the human body posture recognition model based on the fusion posture feature maps; and
updating weight coefficients of the corresponding channels of the human body posture recognition model by using the linear relationship between the channels of the human body posture recognition model;
wherein performing global feature fusion processing on the key point feature map corresponding to each channel of the human body posture recognition model comprises:
performing an average pooling operation on the key point feature maps corresponding to channels of the human body posture recognition model to obtain global fusion feature maps of key points corresponding to the channels of the human body posture recognition model; and
determining the fusion posture feature maps based on the global fusion feature maps of key points corresponding to the channels of the human body posture recognition model; and
wherein after obtaining the global fusion feature maps of key points corresponding to the channels of the human body posture recognition model, performing local feature fusion processing comprises:
using global fusion feature maps of key points corresponding to channels of the human body posture recognition model as feature maps to be locally fused;

dividing the feature maps to be locally fused corresponding to the channels of the human body posture recognition model into multiple feature map groups according to a preset grouping rule;
performing local feature fusion processing using the feature maps to be locally fused corresponding to an i-th channel in a g-th feature map group and the feature maps to be locally fused corresponding to each channel in the g-th feature map group except the feature maps to be locally fused corresponding to the i-th channel to obtain local fusion feature maps of key points corresponding to the channels of the human body posture recognition model; and
determining the fusion posture feature maps based on the local fusion feature maps of key points corresponding to the channels of the human body posture recognition model.

9. The device of claim 8, wherein performing local feature fusion processing on the key point feature map corresponding to each channel of the human body posture recognition model comprises:
using key point feature maps corresponding to channels of the human body posture recognition model as feature maps to be locally fused;
dividing the feature maps to be locally fused corresponding to the channels of the human body posture recognition model into multiple feature map groups according to a preset grouping rule;
performing local feature fusion processing using the feature maps to be locally fused corresponding to an i-th channel in a g-th feature map group and the feature maps to be locally fused corresponding to each channel in the g-th feature map group except the feature maps to be locally fused corresponding to the i-th channel to obtain local fusion feature maps of key points corresponding to the channels of the human body posture recognition model; and
determining the fusion posture feature maps based on the local fusion feature maps of key points corresponding to the channels of the human body posture recognition model.

10. The device of claim 9, wherein after obtaining the local fusion feature maps of key points corresponding to the channels of the human body posture recognition model, performing global feature fusion processing comprises:
performing an average pooling operation on the local fusion feature maps of key points corresponding to the channels of the human body posture recognition model to obtain global fusion feature maps of key points corresponding to the channels of the human body posture recognition model; and
determining the fusion posture feature maps based on the global fusion feature maps of key points corresponding to the channels of the human body posture recognition model.

11. The device of claim 9, wherein local feature fusion processing is performed according to the following equation:

$$U_g[i] = U_g^1[i] + f(U_g^1[\Omega_g \backslash i]),$$

where $U_g[i]$ represents local fusion feature maps of key points corresponding to an i-th channel in a g-th feature map group, $$U_g^1[\Omega_g \backslash i$$

represents the feature maps to be locally fused corresponding to each channel in the g-th feature map group except the feature maps to be locally fused corresponding to the i-th channel, f( ) represents convolution operation, $$U_g^1[i]$$

represents the feature maps to be locally fused corresponding to the i-th channel in the g-th feature map group, $1 \le i \le N$, N represents a total number of key points included in a key point set of the g-th feature map group, $g \le G$, and G represents an amount of the feature map groups.

12. The device of claim 9, wherein the feature map groups comprise: a first group that comprises the key points corresponding to a right ear, a left ear, a right eye, a left eye, a nose and a neck; a second group that comprises the key points corresponding to a right shoulder, a right elbow and a right hand; a third group that comprises the key points corresponding to a left shoulder, a left elbow and a left hand; a fourth group that comprises the key points corresponding to a right hip, a right knee and a right ankle; and a fifth group that comprises the key points corresponding to a left hip, a left knee and a left ankle.

13. The device of claim 8, wherein the linear relationship between the channels of the human body posture recognition model is determined according to the following equation: $s = \sigma(W_2 \delta(W_1 z))$, where s represents the linear relationship between the channels of the human body posture recognition model, $\delta$ represents ReLU function, $\sigma$ represents sigmoid activation function, $W_1 \in R^{C \times C}$ and $W_2 \in R^{C \times C}$, which represents two fully connected layers, C represents a total number of channels of the human posture recognition model, and z represents the fusion posture feature maps.

14. A non-transitory computer-readable storage medium storing instructions that, when executed by at least one processor of a device, cause the at least one processor to perform a method, the method comprising:

obtaining heat maps comprising a predetermined number of key points of a human body by using a preset posture estimation algorithm;

performing depth separable convolution on a feature map corresponding to one of the heat maps corresponding to each of the key points and a convolution kernel of a corresponding channel of a human body posture recognition model to determine a key point feature map corresponding to each channel of the human body posture recognition model;

performing local feature fusion processing and/or global feature fusion processing on the key point feature map corresponding to each channel of the human body posture recognition model to obtain fusion posture feature maps;

determining a linear relationship between the channels of the human body posture recognition model based on the fusion posture feature maps; and updating weight coefficients of the corresponding channels of the human body posture recognition model by using the linear relationship between the channels of the human body posture recognition model;

wherein performing local feature fusion processing on the key point feature map corresponding to each channel of the human body posture recognition model comprises:

using key point feature maps corresponding to channels of the human body posture recognition model as feature maps to be locally fused;

dividing the feature maps to be locally fused corresponding to the channels of the human body posture recognition model into multiple feature map groups according to a preset grouping rule;

performing local feature fusion processing using the feature maps to be locally fused corresponding to an i-th channel in a g-th feature map group and the feature maps to be locally fused corresponding to each channel in the g-th feature map group except the feature maps to be locally fused corresponding to the i-th channel to obtain local fusion feature maps of key points corresponding to the channels of the human body posture recognition model; and determining the fusion posture feature maps based on the local fusion feature maps of key points corresponding to the channels of the human body posture recognition model.

15. The non-transitory computer-readable storage medium of claim 14, wherein after obtaining the local fusion feature maps of key points corresponding to the channels of the human body posture recognition model, performing global feature fusion processing comprises:

performing an average pooling operation on the local fusion feature maps of key points corresponding to the channels of the human body posture recognition model to obtain global fusion feature maps of key points corresponding to the channels of the human body posture recognition model; and determining the fusion posture feature maps based on the global fusion feature maps of key points corresponding to the channels of the human body posture recognition model.

16. The non-transitory computer-readable storage medium of claim 14, wherein performing global feature fusion processing on the key point feature map corresponding to each channel of the human body posture recognition model comprises:

performing an average pooling operation on the key point feature maps corresponding to channels of the human body posture recognition model to obtain global fusion feature maps of key points corresponding to the channels of the human body posture recognition model; and determining the fusion posture feature maps based on the global fusion feature maps of key points corresponding to the channels of the human body posture recognition model.

17. The non-transitory computer-readable storage medium of claim 16, wherein after obtaining the global fusion feature maps of key points corresponding to the channels of the human body posture recognition model, performing local feature fusion processing comprises:

using global fusion feature maps of key points corresponding to channels of the human body posture recognition model as feature maps to be locally fused;

dividing the feature maps to be locally fused corresponding to the channels of the human body posture recognition model into multiple feature map groups according to a preset grouping rule;

performing local feature fusion processing using the feature maps to be locally fused corresponding to an i-th channel in a g-th feature map group and the feature maps to be locally fused corresponding to each channel in the g-th feature map group except the feature maps to be locally fused corresponding to the i-th channel to obtain local fusion feature maps of key points corresponding to the channels of the human body posture recognition model; and determining the fusion posture feature maps based on the local fusion feature maps of key points corresponding to the channels of the human body posture recognition model.

18. The non-transitory computer-readable storage medium of claim 14, wherein local feature fusion processing is performed according to the following equation:

$$U_g[i] = U_g^1[i] + f(U_g^1[\Omega_g \backslash i]),$$

where $U_g[i]$ represents local fusion feature maps of key points corresponding to an i-th channel in a g-th feature map group, $$U_g^1[\Omega_g \backslash i$$

represents the feature maps to be locally fused corresponding to each channel in the g-th feature map group except the feature maps to be locally fused corresponding to the i-th channel, f( ) represents convolution operation, $$U_g^1[i]$$

represents the feature maps to be locally fused corresponding to the i-th channel in the g-th feature map group, $1 \leq i \leq N$, N represents a total number of key points included in a key point set of the g-th feature map group, $g \leq G$, and G represents an amount of the feature map groups.

19. The non-transitory computer-readable storage medium of claim 14, wherein the feature map groups comprise: a first group that comprises the key points corresponding to a right ear, a left ear, a right eye, a left eye, a nose and a neck; a second group that comprises the key points corresponding to a right shoulder, a right elbow and a right hand; a third group that comprises the key points corresponding to a left shoulder, a left elbow and a left hand; a fourth group that comprises the key points corresponding to a right hip, a right knee and a right ankle; and a fifth group that comprises the key points corresponding to a left hip, a left knee and a left ankle.

20. The non-transitory computer-readable storage medium of claim 14, wherein the linear relationship between the channels of the human body posture recognition model is determined according to the following equation: $s=\sigma(W_2\delta(W_1 z))$, where s represents the linear relationship between the channels of the human body posture recognition model, $\delta$ represents ReLU function, $\sigma$ represents sigmoid activation function, $W_1 \in R^{C \times C}$ and $W_2 \in R^{C \times C}$, which represents two fully connected layers, C represents a total number of channels of the human posture recognition model, and z represents the fusion posture feature maps.

* * * * *